(12) United States Patent
Lo et al.

(10) Patent No.: US 7,403,378 B2
(45) Date of Patent: Jul. 22, 2008

(54) PORTABLE COMPUTER

(75) Inventors: Chien-Sheng Lo, Taipei (TW);
Ming-Chin Yang, Taipei (TW);
Chung-Shih Sun, Taipei (TW); Li-Yen Wang, Taipei (TW); Yu-Yuan Chen, Taipei (TW); Hung-Cheng Lee, Taipei (TW); Ying-Chi Chou, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 305 days.

(21) Appl. No.: 11/432,377

(22) Filed: May 12, 2006

(65) Prior Publication Data
US 2006/0288258 A1 Dec. 21, 2006

(30) Foreign Application Priority Data
Jun. 15, 2005 (TW) .............................. 94119891 A (51) Int. Cl.
*G06F 1/16* (2006.01)
(52) U.S. Cl. ...................... 361/683; 341/21; 345/204; 400/472

(58) Field of Classification Search ................... 84/645; 341/20–21; 345/168, 173, 204; 400/472; 361/679–687, 724–727
See application file for complete search history.

(56) References Cited

U.S. PATENT DOCUMENTS

| | | | |
|---|---|---|---|
| 6,081,207 A * | 6/2000 | Batio | 341/20 |
| 2003/0218860 A1 * | 11/2003 | Shiraiwa | 361/681 |
| 2006/0082518 A1 * | 4/2006 | Ram | 345/1.1 |
| 2008/0024970 A1 * | 1/2008 | Lee | 361/683 |

* cited by examiner

*Primary Examiner*—Hung V Duong
(74) *Attorney, Agent, or Firm*—Muncy, Geissler, Olds & Lowe, PLLC (57) ABSTRACT

A portable computer is disclosed. A triple-hinged supporting assembly, which is employed to connect a display unit with a mainframe unit in the portable computer, can easily change various operation positions of the display unit and even rotate 180° to horizontal, so as to fill different requirements of a user.

13 Claims, 11 Drawing Sheets

PORTABLE COMPUTER

RELATED APPLICATIONS

The present application is based on, and claims priority from, Taiwan Application Serial Number 94119891, filed Jun. 15, 2005, the disclosure of which is hereby incorporated by reference herein in its entirety.

FIELD OF THE INVENTION

The present invention relates to a portable computer, and more particularly, to a portable computer having a triple-hinged supporting assembly for connecting a mainframe unit with a display unit.

BACKGROUND OF THE INVENTION

Consequent of advancements in optical technology and semiconductor processing techniques, liquid crystal displays (LCD) have become widely applied to electronic devices, such as display devices of consumer electronics or computer products including portable computers, portable televisions, mobile phones, video cameras, desktop displays and projection televisions, and have become the primary trend of display technology because of advantages including high picture quality, small volume, light weight, low voltage driving, low consumption power and wide applicability.

Typically, a liquid crystal display of a portable computer is fixed to a top cover of the portable computer. When using the portable computer, the liquid crystal display can be shown when the top cover is opened. The top cover is usually connected with the computer mainframe by a shaft. The liquid crystal display of the portable computer can be adjusted to the desired viewing angle of a user by adjusting the angle of the top cover.

Because it is easily carried, the user usually carries the portable computer with him for dealing with daily work. Different working environments require the portable computer to embody various displays to increase the presentation ability of the user. However, the portable computer is limited to a specific display angle range, so the audience nearby and especially seated laterally to the computer cannot clearly see an image shown on the display. In addition, as the software industry has continually changed, computer operating systems have combined a touch-sensitive writing input function, so many companies have produced various tablet computers with touch-sensitive screens. The writing input directly communicates the operation instructions into the computer system (e.g. a display monitor) by a writing device (e.g. a writing pen). The recently developed convertible tablet computer offers an innovative writing input function that has changed the usage habits of the computer and has made the information industry reach a whole new milestone. The convertible tablet computer combines the human pen-writing function of the tablet computer and the keyboard-inputting function and the easy mobility of the portable computer. The convertible tablet computer is effectively designed according to the user that needs to move about often and includes a human input interface and a liquid crystal monitor that can rotate by 180 degrees, so the convertible tablet computer can be easily carried and the persons watching nearby can easily read the data shown on the display.

Figure 1:
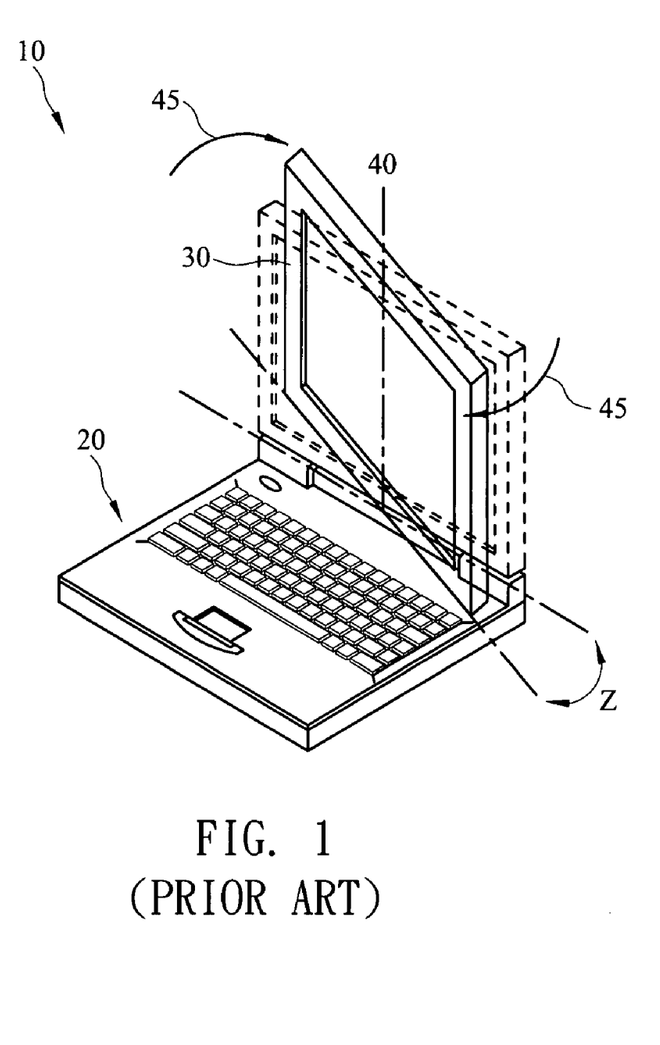
FIG. 1 is a three-dimensional diagram of a conventional portable computer.

The rotating of the monitor of the tablet computer typically is achieved in two ways. FIG. 1 is a three-dimensional diagram of a conventional portable computer. A conventional portable computer 10 comprises a mainframe unit 20 and a display unit 30, wherein the display unit 30 rotates about an axis 40 and along the direction designated by an arrowhead 45, so as to convert between a keyboard-inputting state and a writing-inputting state.

Figure 2A:
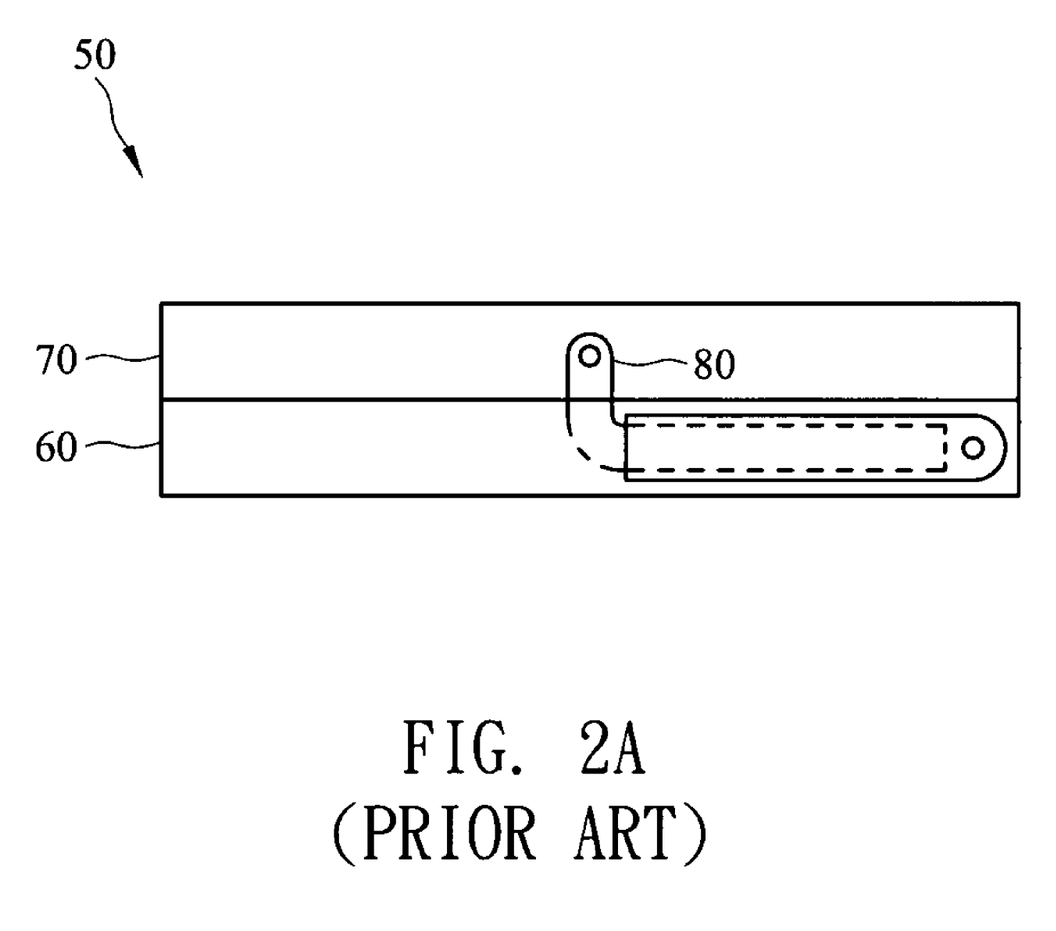
FIG. 2A is a cross-sectional view of another conventional portable computer.

FIG. 2A is a cross-sectional view of another conventional portable computer. A conventional portable computer 50 comprises a mainframe unit 60, a display unit 70 and a supporting assembly 80, wherein two ends of the supporting assembly 80 are respectively installed on two sides of the mainframe unit 60 and two sides of the display unit 70 to connect the mainframe unit 60 and the display unit 70.

Figure 2B:
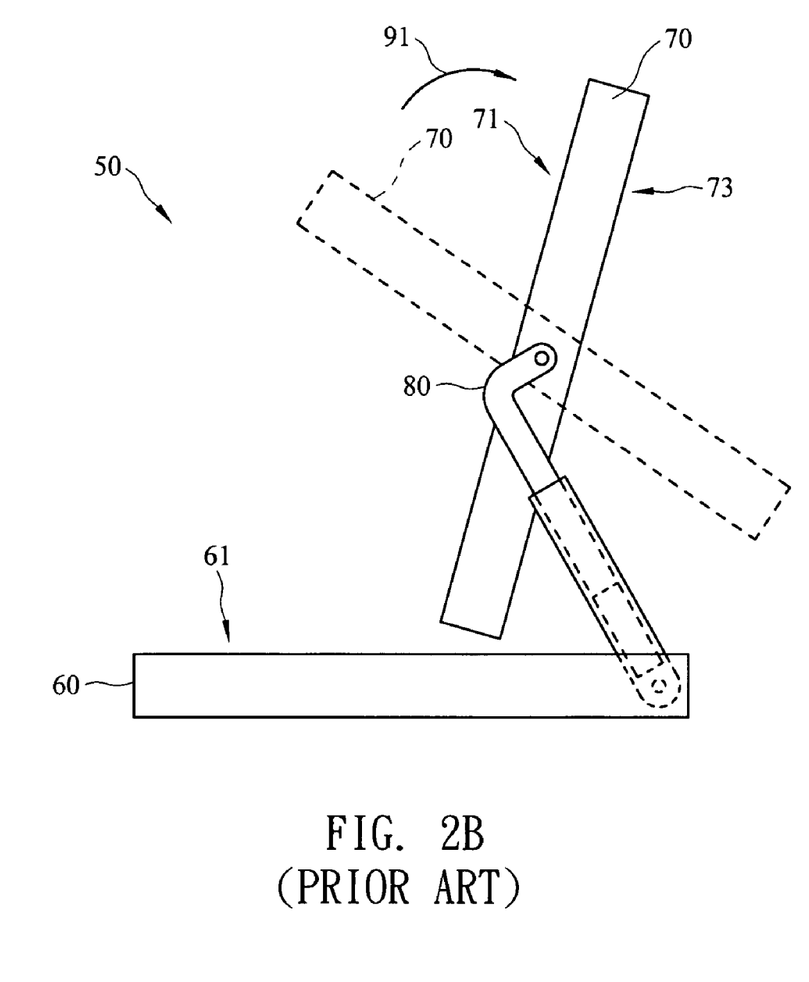
FIGS. 2B and 2C are cross-sectional views of the portable computer in FIG. 2A in a keyboard-inputting state.
Figure 2C:
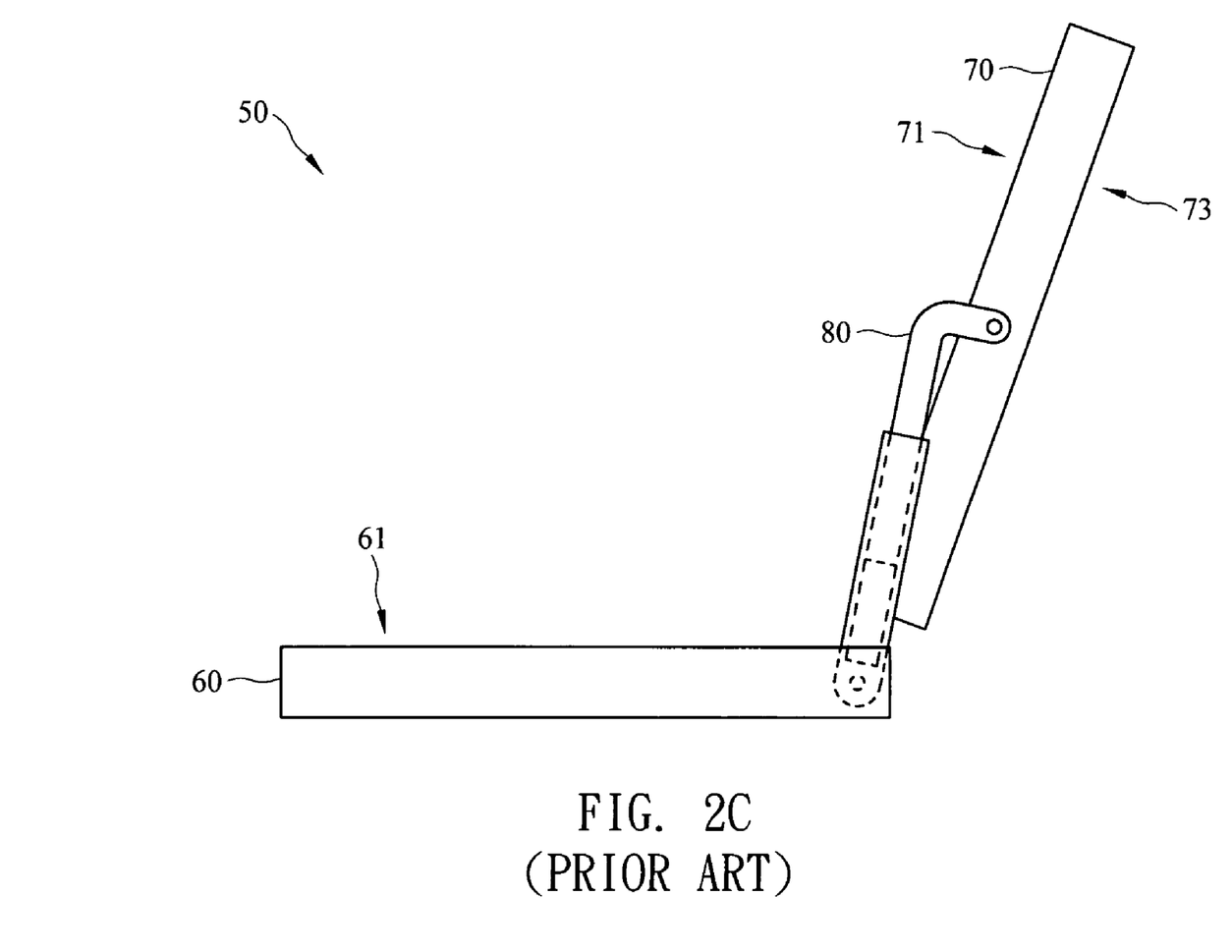

FIGS. 2B and 2C are cross-sectional views of the portable computer in FIG. 2A in a keyboard-inputting state. In FIG. 2B, in the keyboard-inputting state, the display unit 70 rotates following the supporting assembly 80 and along the direction designated by an arrowhead 91. Then, a display surface 71 of the display unit 70 is obliquely deposed over an operation interface 61 of the mainframe unit 60, such as shown in FIG. 2C.

Figure 2D:
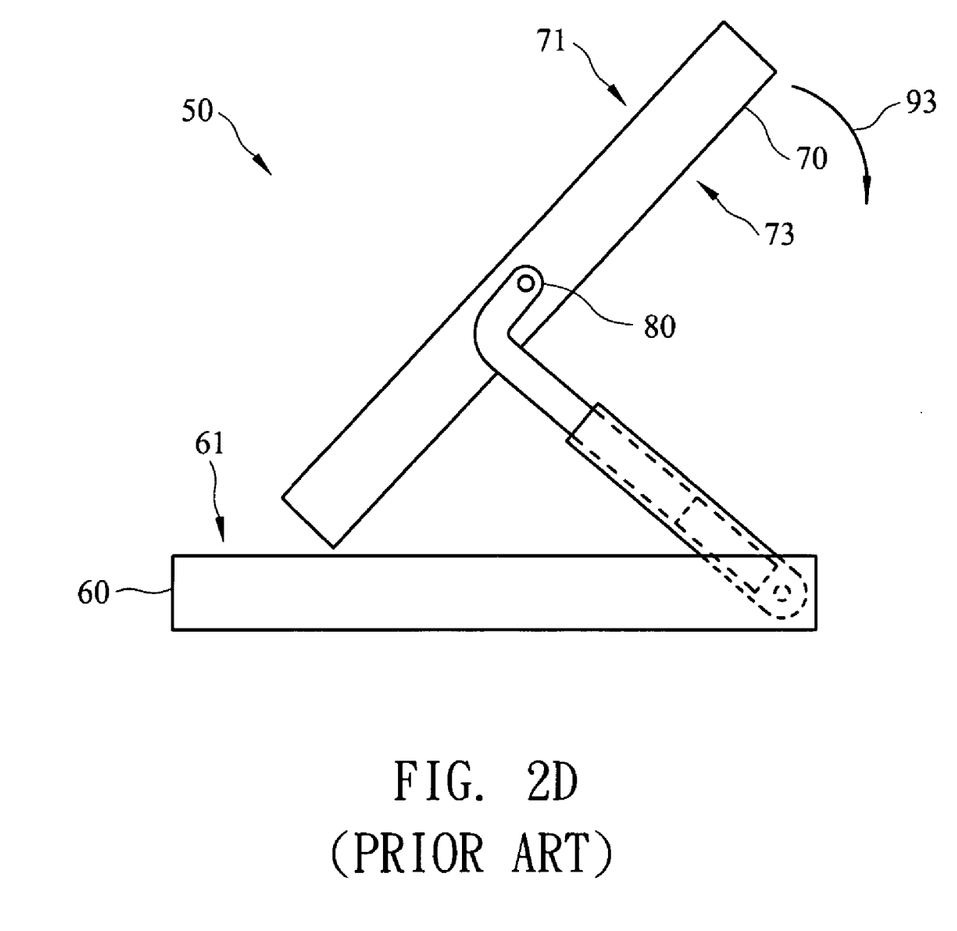
FIG. 2D is cross-sectional view of the portable computer in FIG. 2A in a writing-inputting state.

FIG. 2D is cross-sectional view of the portable computer in FIG. 2A in a writing-inputting state. In the writing-inputting state, the display unit 70 rotates up and down along the direction designated by an arrowhead 93 by using the supporting assembly 80 as a fulcrum, so as to make a backside surface 73 of the display unit 70 stack on the operation interface 61 of the mainframe unit 60 and to levelly depose and expose the display surface 71 of the display unit 70 for written input.

However, the aforementioned portable computers have the following disadvantages. The display of the portable computer in FIG. 1 has a flipping function; however, the liquid crystal display usually shakes in practical operation, resulting in unstable displaying. The display of the portable computer shown in FIGS. 2A through 2D rotates up and down by using the supporting assembly installed in the two sides of the portable computer; however, the operation of the supporting assembly installed in the two sides is inconvenient, and the aesthetic design of the portable computer is hampered.

Therefore, designers, manufacturers and users desire to improve the supporting assembly used to connect the mainframe unit and the display unit such that it can easily change various operation positions of the display unit to provide a stable inputting and displaying environment for the users.

SUMMARY OF THE INVENTION

The objective of the present invention is to provide a portable computer by employing a triple-hinged supporting assembly to connect a mainframe unit with a display unit that can easily change various operation positions of the display unit.

According to the aforementioned objective, the embodiment of the present invention provides a portable computer. The portable computer comprises a mainframe unit, a triple-hinged supporting assembly fixed to a side of the mainframe unit, and a display unit pivoted at the triple-hinged supporting assembly. An indent is formed on an operation interface of the mainframe unit. The display unit has a display surface and a backside surface. The triple-hinged supporting assembly includes a first support, a second support and a third support pivoted in sequence, wherein the first support is fixed to a side of the mainframe unit. A central region of the backside surface of the display unit is pivoted to the third support, and the display unit is moved to a first operation position, a second operation position and a third operation position by the triple-hinged supporting assembly. When the display unit is at the first operation position, the display surface stacks on the operation interface of the mainframe unit. When the display unit is at the second operation position, a side of the display surface is positioned in the indent and is obliquely set over the operation interface; and when the display unit is at the third operation position, the backside surface of the display unit stacks on the operation interface of the mainframe unit.

According to a preferred embodiment of the present invention, when the display unit is at the second operation position, a first height of the first support above the operation interface is substantially half a second height of the second support above the operation interface.

According to a preferred embodiment of the present invention, when the display unit is at the third operation position, the first support and the second support are folded, and the indent is used to hold the third support.

According to a preferred embodiment of the present invention, the portable computer may be a tablet computer. The first support, the second support and the third support are flat plates or frames.

In using the portable computer, the triple-hinged supporting assembly is employed to connect the mainframe unit with the display unit, and the display unit can be easily changed to various operation positions, even to rotate 180° to horizontal, so as to meet different requirements of a user.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

In the preferred embodiment of the present invention, a triple-hinged supporting assembly, which is employed to connect a display unit with a mainframe unit in the portable computer, can easily change various operation positions of the display unit. Reference will now be made in detail to the preferred embodiments of the portable computer of the present invention, examples of which are illustrated in the accompanying drawings FIGS. 3A through 3D.

Figure 3A:
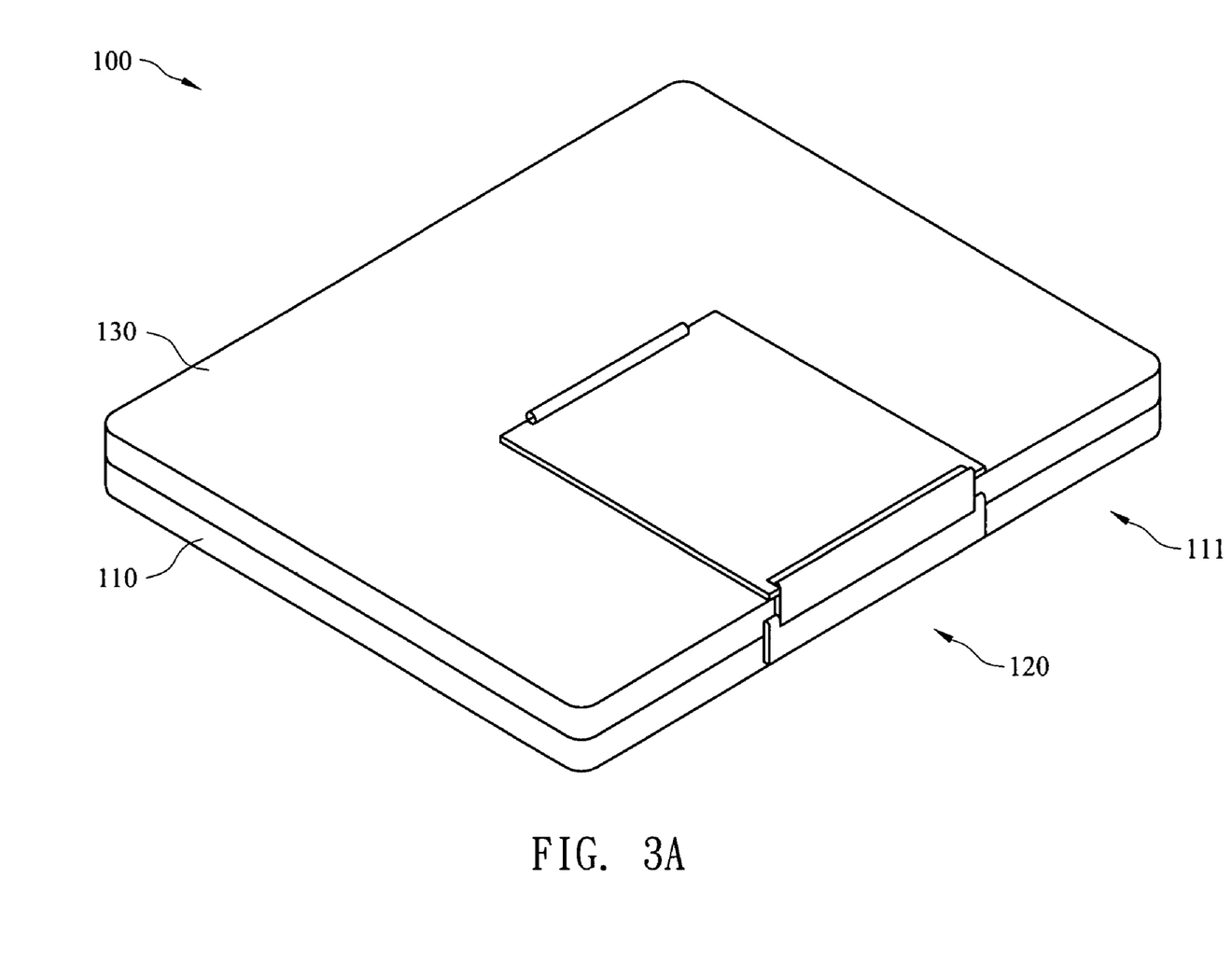
FIG. 3A is a three-dimensional diagram of a portable computer in accordance with a preferred embodiment of the present invention.

FIG. 3A is a three-dimensional diagram of a portable computer in accordance with a preferred embodiment of the present invention. A portable computer 100 comprises a mainframe unit 110, a triple-hinged supporting assembly 120 fixed to a side 111 of the mainframe unit 110, and a display unit 130 pivoted at the triple-hinged supporting assembly 120.

One feature of the portable computer 100 of the present invention is to employ the triple-hinged supporting assembly 120 to connect the mainframe unit 110 and the display unit 130, so that various operation positions of the display unit 130, such as a display surface of the display unit 130 covering and stacking on the mainframe unit 110, the display surface obliquely deposing on the mainframe unit 110, or the display surface stacking on the mainframe unit 110 and being exposed, can be changed by the triple-hinged supporting assembly 120.

Figure 3B:
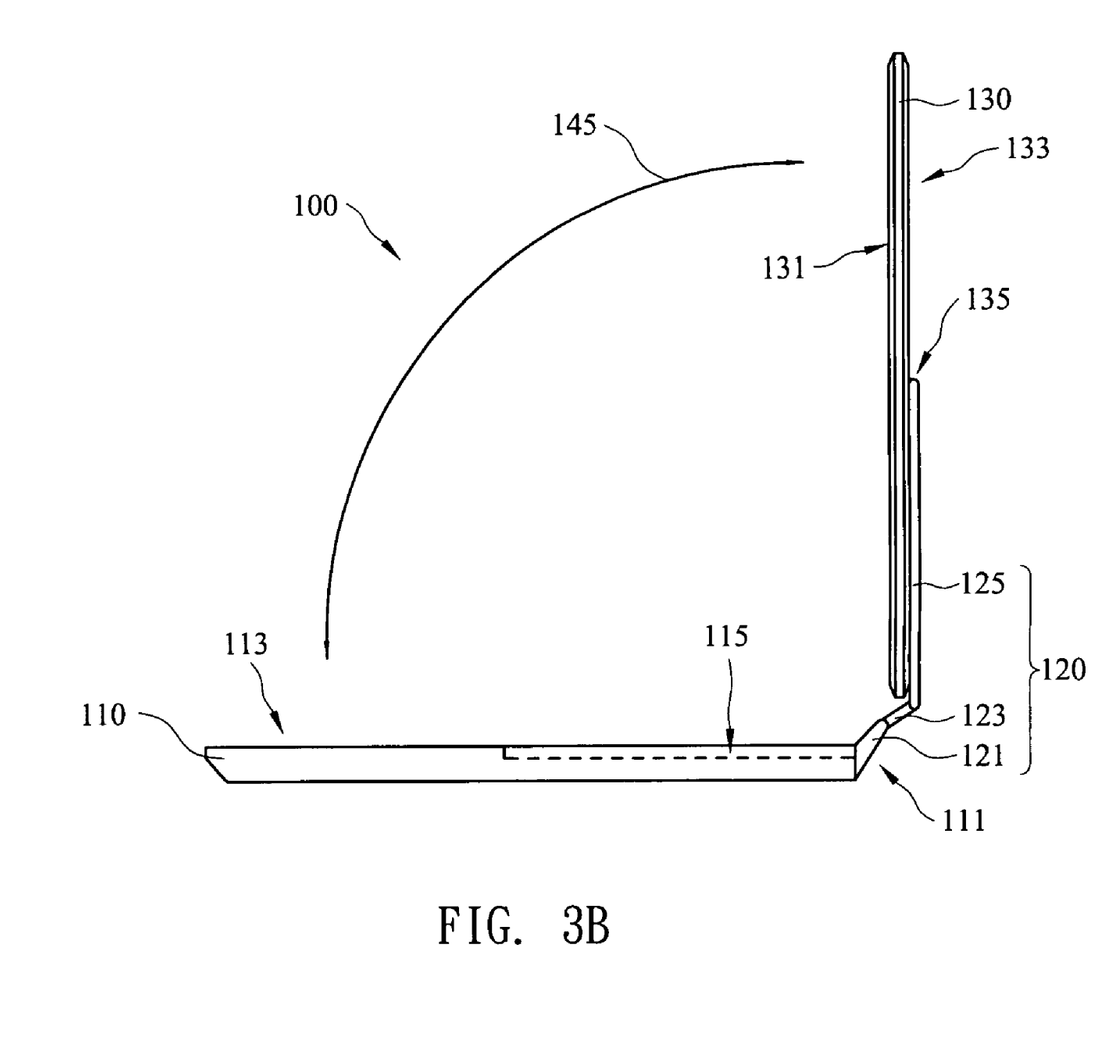
FIG. 3B is a lateral view of a portable computer in accordance with a preferred embodiment of the present invention.

FIG. 3B is a lateral view of a portable computer in accordance with a preferred embodiment of the present invention. The portable computer 100 is a tablet computer, in which an operation interface 113 of the mainframe unit 110 is set with an indent 115 and another device, such as a keyboard or a touch pad. The display unit 130 has a display surface 131 and a backside surface 133, in which the display unit 130 is a touch display and through which operating instructions can be transmitted by touching the screen with a hand, or by writing on the screen with a writing device (e.g. a writing pen). The triple-hinged supporting assembly 120 includes a first support 121, a second support 123 and a third support 125 pivoted in sequence, in which the first support 121 is fixed to one side 111 of the mainframe unit 110, and the third support 125 is pivoted to the central region 135 of the backside surface 133 of the display unit 130. The first support 121, the second support 123 and the third support 125 are flat plates herein, but may also be other structures, such as frames.

Figure 3C:
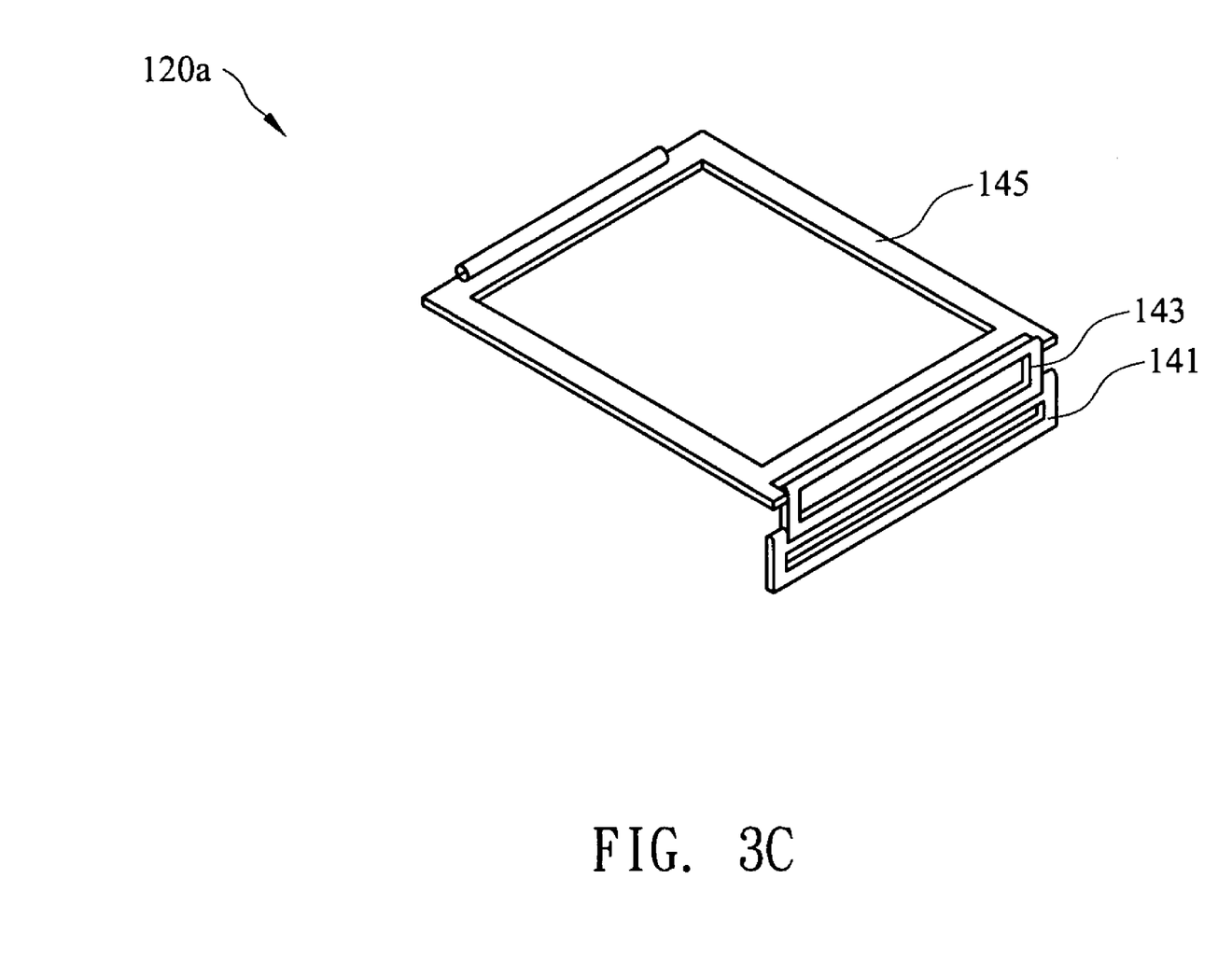
FIG. 3C is a three-dimensional diagram of a triple-hinged supporting assembly in accordance with another preferred embodiment of the present invention.

Reference is made to FIG. 3C, which is a three-dimensional diagram of a triple-hinged supporting assembly in accordance with another preferred embodiment of the present invention. The triple-hinged supporting assembly 120a includes a first frame 141, a second frame 143 and a third frame 145 pivoted in sequence. However, the triple-hinged supporting assembly of the present invention can be composed of any combinations of flat plates and frames, such as the combination of the first support 121, the second frame 143 and the first support 125 pivoted in sequence, or the combination of the first frame 141, the second support 123 and the third frame 145 pivoted in sequence. Hence, the structure of the triple-hinged supporting assembly of the present invention is not limited to the aforementioned examples.

Figure 3D:
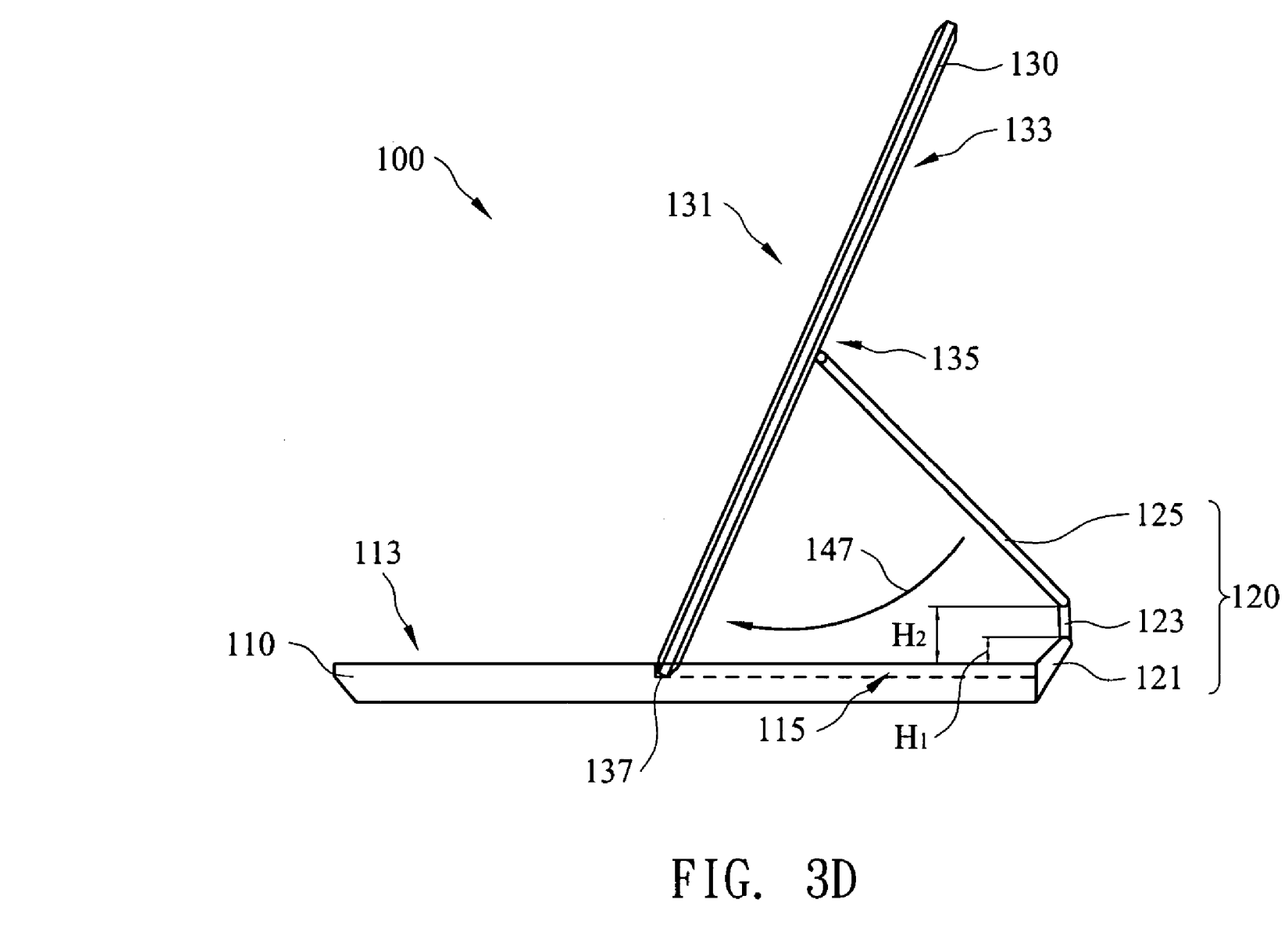
FIG. 3D is a cross-sectional view of a portable computer at a second operation position in accordance with a preferred embodiment of the present invention.

As is understood by a person skilled in the art, circuits (not shown) between the display unit 130 and the mainframe unit 110 may be installed in the triple-hinged supporting assembly 120, so those details are not described herein. A user can move the display unit 130 to a first operation position (such as shown in FIG. 3A, in which the display surface 131 of the display unit 130 covers and stacks on the mainframe unit 110), a second operation position (such as shown in FIG. 3D, in which the display surface 131 is obliquely deposed on the mainframe unit 110), or a third operation position (such as shown in FIG. 3F, in which the display surface 131 stacks on the mainframe unit 110 and is exposed) by using the triple-hinged supporting assembly 120. The display unit 130 is rotated horizontal by using the third support 125 pivoted at the central region 135 of the backside surface 133 as a rotating axis, in which the display unit 130 can even rotate to 180° horizontal, so as to fill different requirements of a user.

When the display unit 130 is at the first operation position, such as at an unused condition, the display surface (not shown) covers and stacks on the operation interface (not shown) of the mainframe unit 130, such as shown in FIG. 3A.

When the display unit 130 is at the second operation position, such as at an input condition with a keyboard, i.e. when the display surface 131 is obliquely deposed on the mainframe unit 110, a first height $H_1$ of the first support 121 above the operation interface 113 of the mainframe unit 110 is substantially half a second height $H_2$ of the second support 123 above the operation interface 113, so as to position a side 137 of the display surface 131 in the indent 115 and to be obliquely deposed over the operation interface 113, such as shown in FIG. 3D.

Figure 3E:
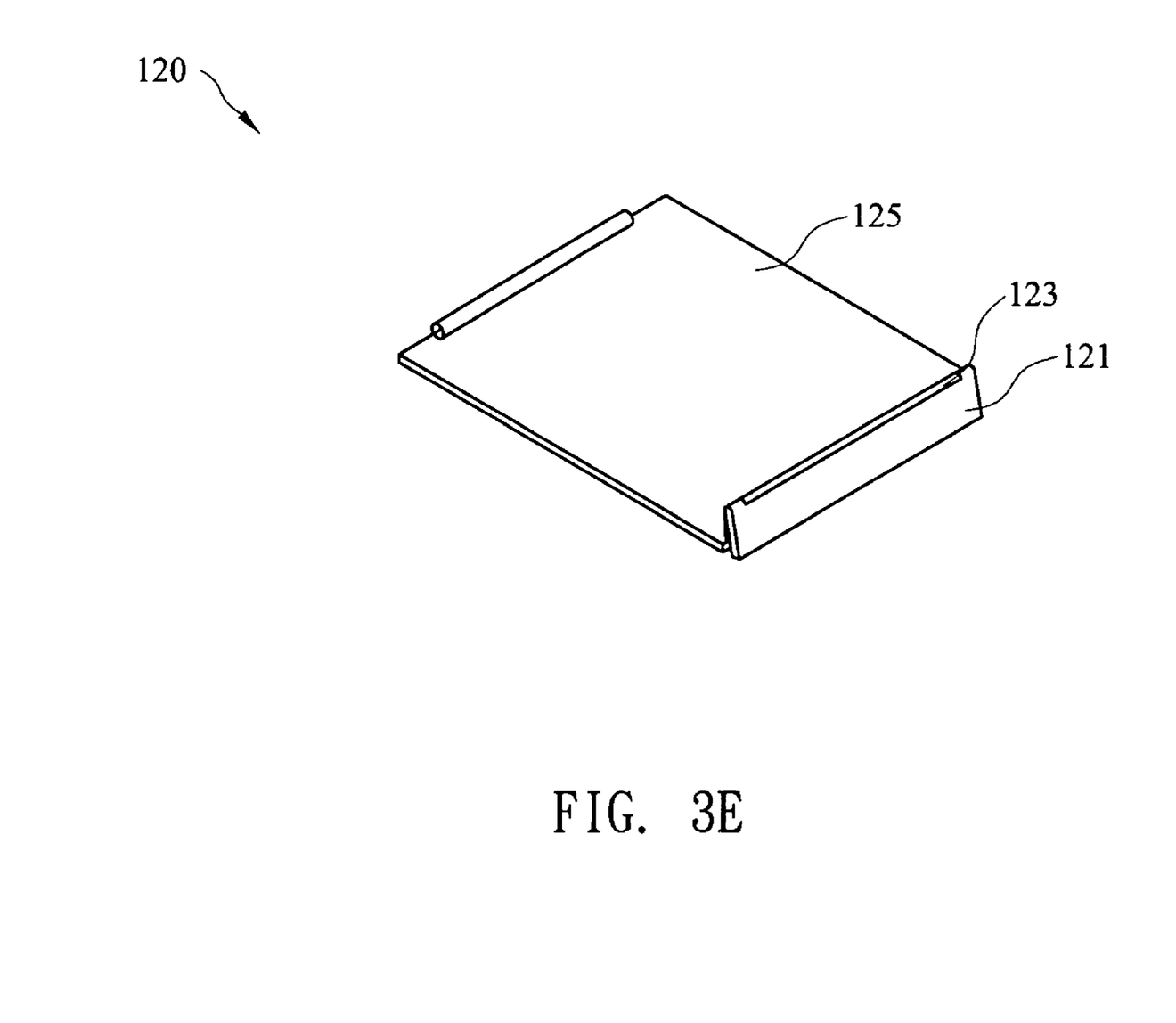
FIG. 3E is a three-dimensional diagram of a triple-hinged supporting assembly at a third operation position in accordance with a preferred embodiment of the present invention.
Figure 3F:
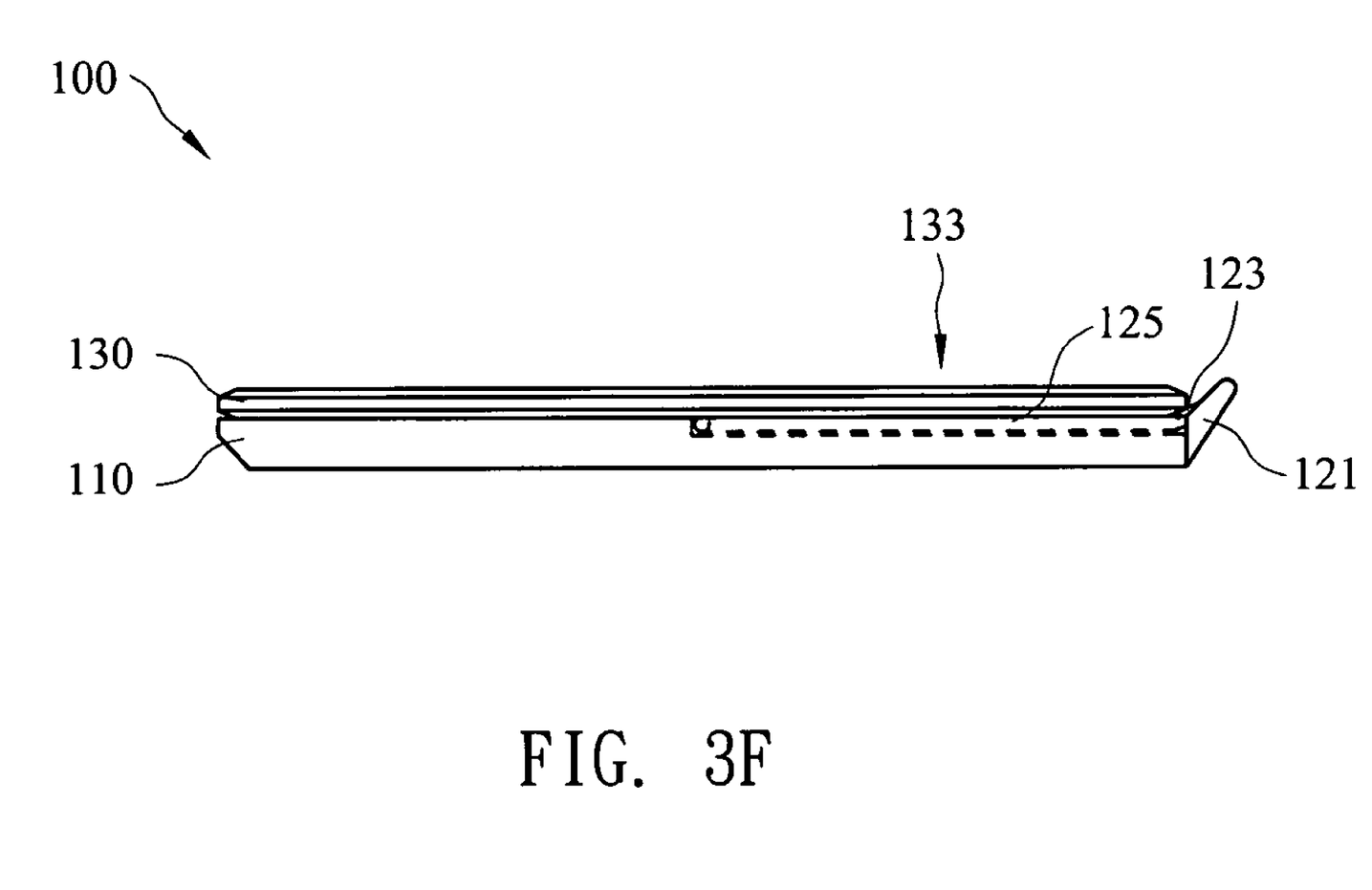
FIG. 3F is a cross-sectional view of a portable computer at a third operation position in accordance with a preferred embodiment of the present invention.

When the display unit 130 is at the third operation position, such as at a written input condition, i.e. when the display surface 131 stacks on the mainframe unit 110 and is exposed, the first support 121 and the second support 123 of the triple-hinged supporting assembly 120 are folded together, such as shown in FIG. 3E. The indent 115 is used to hold the third support 125, so as to make the backside surface 133 of the display unit 130 stack on the operation interface 113 of the mainframe unit 110 and to make the display surface 131 be exposed and deposed out of the mainframe unit 110 for writing thereon, such as shown in FIG. 3F.

The portable computer of the present invention employs a triple-hinged supporting assembly to connect a mainframe unit with a display unit, and thus various operation positions of the display unit can be easily changed with the triple-hinged supporting assembly. The display unit rotates to horizontal by using the support pivoted at the central region of the backside surface of the display unit as a rotating axis, in which the display unit can even rotate 180° to horizontal, so as to fill different requirements of a user. It is noteworthy that the force applied by the triple-hinged supporting assembly of the present invention is located at the central region of the backside surface of the display unit, so that the force received by the display unit can be decreased to the lowest, which is superior to the conventional supporting assembly.

According to the aforementioned description, one advantage of the present invention is that the portable computer of the present invention employs a triple-hinged supporting assembly to connect a mainframe unit with a display unit, such that the display unit can be easily changed to various operation positions, even to rotate 180° to horizontal, so as to fill different requirements of a user.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A portable computer, comprising:
    a mainframe unit including an operation interface;
    a triple-hinged supporting assembly including a first support, a second support and a third support pivoted in sequence, wherein the first support is fixed to a side of the mainframe unit; and
    a display unit having a display surface and a backside surface, wherein the backside surface is pivoted to the triple-hinged supporting assembly, and the display unit is moved to a first operation position, a second operation position and a third operation position by the triple-hinged supporting assembly,
    wherein when the display unit is at the first operation position, the display surface covers and stacks on the operation interface of the mainframe unit;
    when the display unit is at the second operation position, the display surface is exposed and obliquely deposed over the mainframe unit; and
    when the display unit is at the third operation position, the display surface is exposed and stacks on the mainframe unit.

2. The portable computer according to claim 1, wherein when the display unit is at the third operation position, the first support and the second support are folded.

3. The portable computer according to claim 1, wherein the first support is a flat plate or a frame.

4. The portable computer according to claim 1, wherein the second support is a flat plate or a frame.

5. The portable computer according to claim 1, wherein the third support is a flat plate or a frame.

6. A tablet computer, comprising:
    a mainframe unit including an operation interface;
    a triple-hinged supporting assembly including a first support, a second support and a third support pivoted in sequence, wherein the first support is fixed to a side of the mainframe unit; and
    a display unit having a display surface and a backside surface, wherein the backside surface is pivoted to the triple-hinged supporting assembly, and the display unit is moved to a first operation position, a second operation position and a third operation position by the triple-hinged supporting assembly.

7. The tablet computer according to claim 6, wherein when the display unit is at the third operation position, the first support and the second support are folded.

8. The tablet computer according to claim 6, wherein the first support is a flat plate or a frame.

9. The tablet computer according to claim 6, wherein the second support is a flat plate or a frame.

10. The tablet computer according to claim 6, wherein the third support is a flat plate or a frame.

11. The tablet computer according to claim 6, wherein when the display unit is at the first operation position, the display surface covers and stacks on the operation interface of the mainframe unit.

12. The tablet computer according to claim 6, wherein when the display unit is at the second operation position, the display surface is exposed and obliquely deposed on the operation interface.

13. The tablet computer according to claim 6, wherein when the display unit is at the third operation position, the backside surface covers and stacks on the operation interface of the mainframe unit.

* * * * *